United States Patent
Namiki

(10) Patent No.: US 12,524,577 B2
(45) Date of Patent: Jan. 13, 2026

(54) DATA SEARCH SYSTEM, NON-TRANSITORY STORAGE MEDIUM FOR STORING DATA STRUCTURE AND DATA SEARCH METHOD

(71) Applicant: DENSO CORPORATION, Kariya (JP)

(72) Inventor: Haruhiko Namiki, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 275 days.

(21) Appl. No.: 18/306,784

(22) Filed: Apr. 25, 2023

(65) Prior Publication Data

US 2023/0259659 A1  Aug. 17, 2023

Related U.S. Application Data

(63) Continuation of application No. PCT/JP2021/038434, filed on Oct. 18, 2021.

(30) Foreign Application Priority Data

Oct. 30, 2020  (JP) ................ 2020-182180

(51) Int. Cl.
*G06F 21/64* (2013.01)
*G06F 21/60* (2013.01)

(52) U.S. Cl.
CPC ............ *G06F 21/64* (2013.01); *G06F 21/602* (2013.01)

(58) Field of Classification Search
CPC ........ G06F 21/64; G06F 21/602; G06F 16/28; H04L 9/32
See application file for complete search history.

(56) References Cited

FOREIGN PATENT DOCUMENTS

| | | |
|---|---|---|
| JP | 3055498 B2 | 6/2000 |
| JP | 6533924 B1 | 6/2019 |
| JP | 2019-123456 A | 7/2019 |
| JP | 2020-086902 A | 6/2020 |
| WO | WO-2020100326 A1 * | 5/2020 |

* cited by examiner

*Primary Examiner* — Alexander Lagor
*Assistant Examiner* — Shu Chun Gao
(74) *Attorney, Agent, or Firm* — Maschoff Brennan

(57) ABSTRACT

A data search system includes: a blockchain storage unit that stores a blockchain on which search data for searching the registration data from the database is stored; a DB storage unit that stores the database; a DN search unit that acquires the registration data from the database and provides the user terminal device with the acquired registration data; and a tamper determination unit that determines whether the registration data has been tampered. The tamper determination unit is configured to: generate a hash value based on the registration data acquired by the DB search unit; and determine whether the registration data is tampered by comparing the generated hash value with the search data stored on the blockchain.

5 Claims, 5 Drawing Sheets

FIG. 3

CUSTOMER DATA TABLE

| USER ID HASH VALUE | MANAGEMENT ITEM TABLE (STRING) | HISTORY TABLE (STRING) |
|---|---|---|
| AAAAA | sample01_column | sample01 |
| ... | ... | ... |

MANAGEMENT ITEM TABLE

| COLUMN NAME (STRING) | DISPLAY NAME (STRING) | DISPLAY FLAG (STRING) |
|---|---|---|
| REGISTRATION DATA 01 | PRODUCT NAME | 1 |
| REGISTRATION DATA 02 | COMPANY NAME | 1 |
| ... | ... | ... |

HISTORY TABLE

| PROCESS DATA HASH VALUE | REGISTRATION DATA 01 (STRING) | REGISTRATION DATA 02 (STRING) |
|---|---|---|
| BBBBB | 11111 | 22222 |
| CCCCC | 33333 | 44444 |
| ... | ... | ... |

DB

DATA SEARCH SYSTEM, NON-TRANSITORY STORAGE MEDIUM FOR STORING DATA STRUCTURE AND DATA SEARCH METHOD

CROSS REFERENCE TO RELATED APPLICATIONS

This application is a continuation application of International Patent Application No. PCT/JP2021/038434 filed on Oct. 18, 2021, which designated the U.S. and claims the benefit of priority from Japanese Patent Application No. 2020-182180 filed on Oct. 30, 2020. The entire disclosure of the above application is incorporated herein by reference.

TECHNICAL FIELD

The present disclosure relates to a data search system or the like that is configured to search data and determine if the searched data has been tampered.

BACKGROUND ART

There has been known a technique of storing a database in a server and of searching data in the database through a terminal device outside of the server.

SUMMARY

One aspect of the present disclosure is a data search system that provides a user terminal device with registration data searched from a database in which a plurality of the registration data are registered. The system includes: a blockchain storage unit that is configured to store a blockchain on which search data for searching the registration data from the database is stored, the search data being hashed data that is generated based on the registration data registered in the database; a DB storage unit that is configured to store the database; a DN search unit that is configured to acquire the registration data from the database and provide the user terminal device with the acquired registration data; and a tamper determination unit that is configured to determine whether the registration data has been tampered. The registration data is registered in the database in association with the search data. The DB search unit is configured to search the registration data registered in association with the search data from the database. The tamper determination unit is configured to: generate a hash value based on the registration data acquired by the DB search unit; and determine whether the registration data is tampered by comparing the generated hash value with the search data stored on the blockchain.

BRIEF DESCRIPTION OF DRAWINGS

FIG. 3 is a diagram showing a structure of a database.

DESCRIPTION OF EMBODIMENTS

Figure 1:
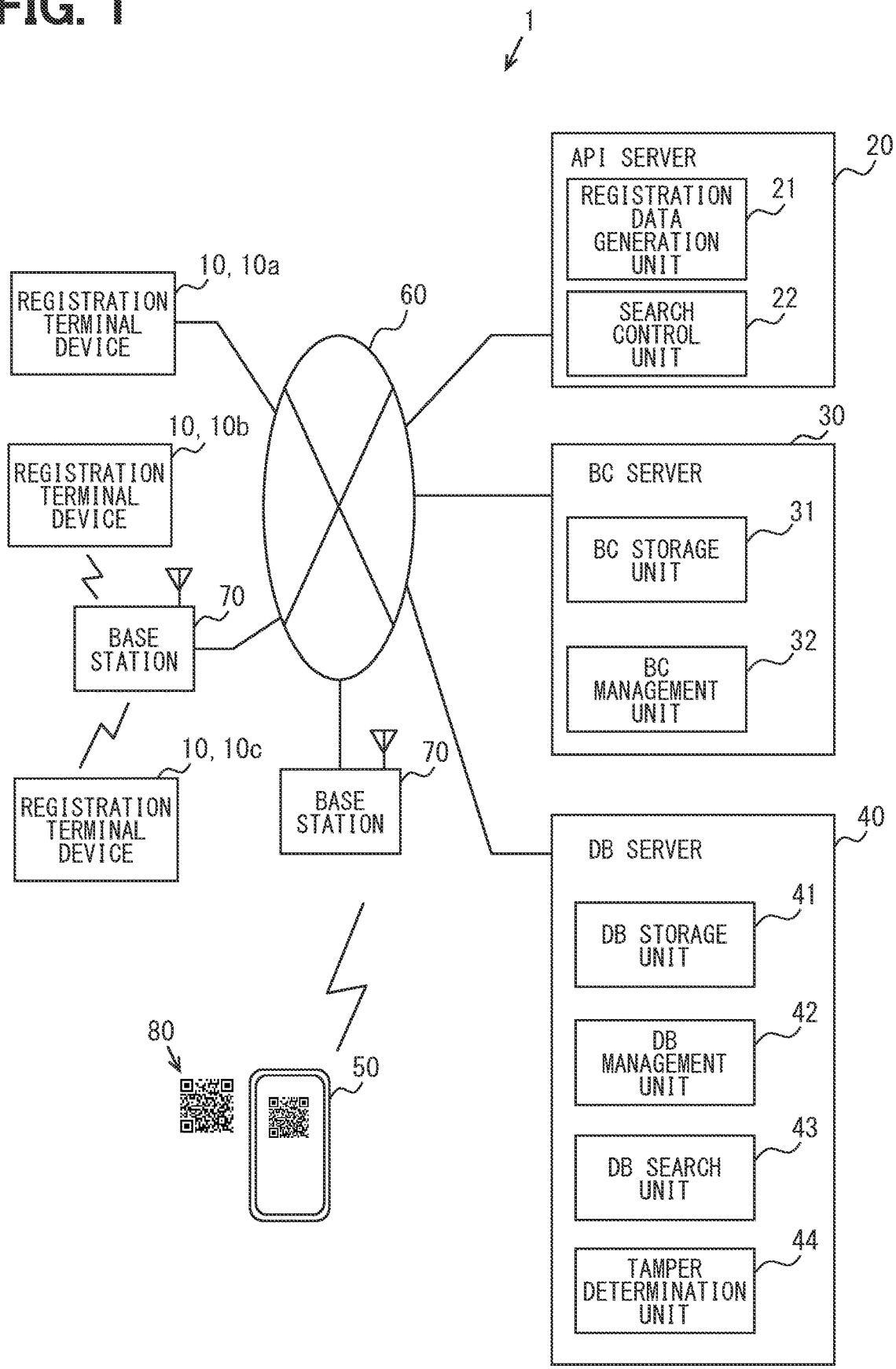
FIG. 1 shows an overall configuration diagram of a data search system according to an embodiment.

To begin with, a relevant technology will be described only for understanding the following embodiments.

Since data registered in a database may be tampered, a system or the like that can determine whether the data registered in the database is tampered has been desired.

The present disclosure has been made in consideration of this situation, and one of objectives of the present disclosure is to provide a data search system and so on that is configured to easily determine whether data registered in a database has been tampered.

A first aspect of the present disclosure is a data search system that provides a user terminal device with registration data searched from a database in which a plurality of the registration data are registered. The system includes: a blockchain storage unit that is configured to store a blockchain on which search data for searching the registration data from the database is stored, the search data being hashed data that is generated based on the registration data registered in the database; a DB storage unit that is configured to store the database; a DN search unit that is configured to acquire the registration data from the database and provide the user terminal device with the acquired registration data; and a tamper determination unit that is configured to determine whether the registration data has been tampered. The registration data is registered in the database in association with the search data. The DB search unit is configured to search the registration data registered in association with the search data from the database. The tamper determination unit is configured to: generate a hash value based on the registration data acquired by the DB search unit; and determine whether the registration data is tampered by comparing the generated hash value with the search data stored on the blockchain.

In a second aspect of the present disclosure, a non-transitory, computer readable, tangible storage medium is disposed in a database in which a plurality of registration data are registered. The storage medium stores a data structure formed of the plurality of registration data and a plurality of search data. Each of the registration data is associated with a corresponding one of the search data. The search data is hashed data generated based on the registration data registered in the database, and the search data is stored on a blockchain and is used for searching the registration data from the database.

In a third aspect of the present disclosure, a data search method is a method for providing a user terminal device with refrigeration data that is searched from a database in which a plurality of registration data are registered. The method includes: storing search data on a blockchain, the search data being hashed data generated based on the registration data registered in the database and being used for searching the registration data; acquiring, using the search data, the registration data from the database where the registration data is registered in association with the search data; providing the acquired registration data with the user terminal device; generating a hash value based on the registration data acquired from the database; and determining whether the registration data is tampered by comparing the generated hash value with the search data stored on the blockchain.

In this data search system, storage medium storing a data structure, and data search method, search data is required in order to search registration data from the database. Since this search data is stored on the blockchain, it is difficult to tamper the search data.

The search data stored on the blockchain is a hash value generated from the registration data. Therefore, if the registration data registered in the database has not been tampered, the hash value generated based on the registration data registered in the database matches the search data. On the other hand, if the registration data registered in the database is tampered, the hash value generated from the registration data would not match the search data obtained from the blockchain. Therefore, tampering of the registration data can be easily detected.

Next, an embodiment will be described below with reference to the drawings. FIG. 1 shows an overall configuration diagram of a data search system 1 according to the present embodiment. The data search system 1 includes a registration terminal device 10, an API server 20, a BC server 30, a DB server 40, and a user terminal device 50.

FIG. 1 shows three registration terminal devices 10a, 10b, and 10c. The registration terminal devices 10a, 10b, and 10c may be collectively referred to as "registration terminal device 10" when they are not individually referred. The registration terminal device 10 is a terminal device used when registration data is registered in the DB server 40. Although three registration terminal devices 10 are shown in FIG. 1, the number of the registration terminal devices 10 is not necessarily limited to 3. That is, at least one registration terminal device 10 is required.

The registration terminal device 10 includes a computer. Registration data is input to the registration terminal device 10 by an operator's operation or automatic processing. The registration terminal device 10 is connected to a communication network 60. The registration terminal device 10a is connected to the communication network 60 via wired connection. On the other hand, the registration terminal devices 10b and 10c wirelessly communicate with a base station 70 which is connected to the communication network 60. In this way, the registration terminal device 10 may be connected to the communication network 60 by wired or wireless connection.

The registration data to be input to the registration terminal device 10 may be any data that needs to be registered in the DB server 40, and the type of data is not particularly restricted. In the following description, traceability data is used as the registration data for understanding purposes. The traceability data is data for enabling the traceability of products.

For example, the registration terminal device 10 is installed in a company's office or factory. The registration terminal device 10 transmits transmission data including the registration data to the API server 20.

The API server 20, the BC server 30, and the DB server 40 include computers equipped with processors, ROMs, RAMs, and the like. The API server 20 is a server serving as an interface accessed by the registration terminal device 10 and the user terminal device 50. The API server 20 operates as a registration data generation unit 21 and a search control unit 22 when the processor executes programs stored in a storage medium such as a ROM.

The registration data generation unit 21 generates registration data based on the transmission data transmitted from the registration terminal device 10. The registration data includes BC registration data, which is the registration data to be registered on the blockchain BC, and DB registration data, which is the registration data to be registered in the database DB. The registration data unit 21 transmits the BC registration data to the BC server 30 and transmits the DB registration data to the DB server 40.

The search control unit 22 serves as a relay for data transmission among the user terminal device 50, the BC server 30, and the DB server 40 during search of the registration data registered in the database DB.

Although only one BC server 30 is shown in FIG. 1, the data search system 1 actually includes a plurality of BC servers 30 having the same configuration. The BC server 30 has a BC storage unit 31. The BC storage unit 31 has a writable non-volatile storage medium, and stores the block chain BC shown in FIG. 2 on the storage medium. Also, the BC server 30 operates as a BC management unit 32 when the processor executes programs stored in a storage medium such as a ROM.

The BC management unit 32 manages the block chain BC, such as updating the block chain BC stored in the BC storage unit 31 and reading data from the block chain BC.

The DB server 40 has a DB storage unit 41. The DB storage unit 41 has a writable non-volatile storage medium, and stores three types of tables shown in FIG. 3 in the storage medium. The database DB is formed by combining the three types of tables shown in FIG. 3.

The DB server 40 also operates as a DB management unit 42, a DB search unit 43, and a tamper determination unit 44 when the processor executes programs stored in a storage medium such as a ROM.

The DB management unit 42 manages the database DB, such as creating and updating the database DB stored in the DB storage unit 41.

The DB search unit 43 searches the registration data in the database DB and acquires the registration data from the database DB. Then, the acquired registration data is provided to the user terminal device 50 via the API server 20.

The tamper determination unit 44 determines whether the registration data acquired by the DB search unit 43 has been tampered. Details of the processing executed by the DB search unit 43 and the tamper determination unit 44 will be described later with reference to FIG. 5.

The user terminal device 50 is a terminal device operated by a user when obtaining registration data registered in the database DB. In the example shown in FIG. 1, a smart phone is used as the user terminal device 50. The number of user terminals 50 is not necessarily limited to one. One or more user terminals 50 may be used. Similar to the registration terminal device 10, the user terminal device 50 includes a computer having a processor, ROM, RAM, and the like. The registration terminal device 10 may also be used as the user terminal device 50.

When searching desired registration data from the database DB using the user terminal device 50, the user transmits transmission data through the user terminal device 50. This transmission data does not include items actually registered in the database DB. Instead, the transmitted data includes a traceability ID hash value. The traceability ID hash value is identifying data for identifying the search data stored on the blockchain BC.

The user terminal device 50 is able to acquire the traceability ID hash value via a variety types of means. As an example, as shown in FIG. 1, the user terminal device 50 can acquire the traceability ID hash value by reading a 2-D code 80 in which the traceability ID hash value is stored.

[Structure of the Blockchain BC]

Figure 2:
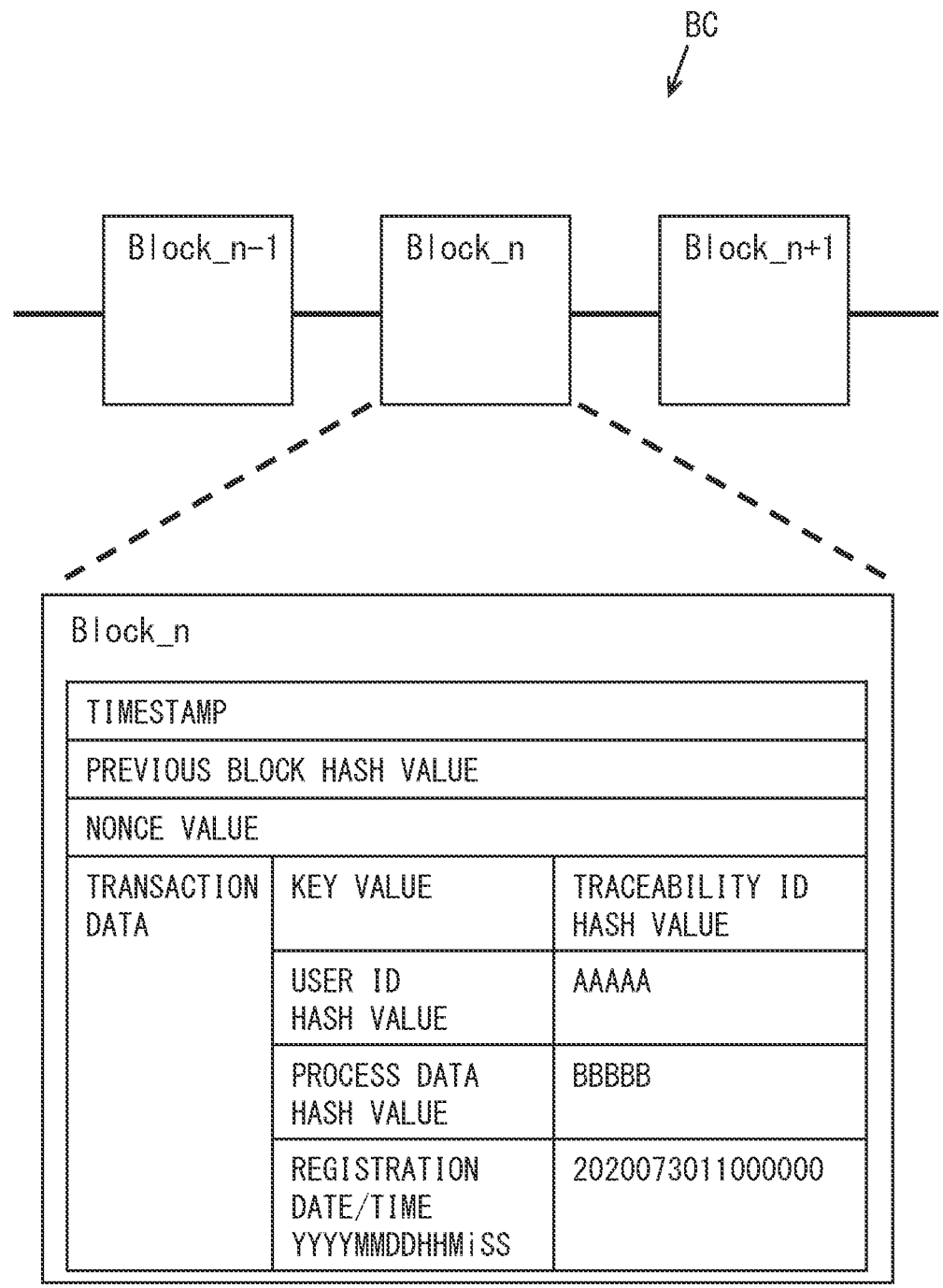
FIG. 2 is a diagram showing a structure of a blockchain.

The structure of the blockchain BC will be explained with reference to FIG. 2. The blockchain BC is a structure formed of a plurality of blocks that are connected to each other. A block contains a timestamp, a previous block hash value, a nonce value, and transaction data.

The timestamp is the time at which the block was created. The previous block hash value is a value obtained by hashing the data included in the previous block using a predetermined hash function. Various hash functions can be used for hashing. As an example, SHA256 can be used as a hash function. Also, various hash functions such as SHA256 can be used as a hash function for generating hash values which will be described later. The nonce value is a value for ensuring that the hash value of the block including this nonce value satisfies a preset condition.

The transaction data includes four items: a key value, a user ID hash value, a process data hash value, and registration date/time. The user ID hash value is a value obtained by hashing a user ID. The user ID is a value generated by the registration data unit 21 of the API server 20 based on TokenID transmitted from the registration terminal device 10. The registration data unit 21 also generates the user ID hash value and the process data hash value.

The process data hash value is Merkle root of the registration data transmitted from the registration terminal device 10. Therefore, the process data hash value is one example of the registration data hash value obtained by hashing the registration data. The registration date/time is the date and time given by the registration data generation unit 21 The registration data/time indicates the date and time the registration data generation unit 21 executes the process of generating the BC registration data.

The key value is the traceability ID hash value. The traceability ID hash value is also generated by the registration data unit 21. The traceability ID hash value is Merkle root of the user ID hash value, the process data hash value, the date/time information, and a timestamp server hash value. The timestamp server hash value is a hash value generated by a timestamp server, which is an external server outside of the data search system 1. The timestamp server generates the timestamp server hash value by multiplying the date with news corresponding to the date on which the timestamp server hash value is generated. The registration data unit 21 acquires this timestamp server hash value from the timestamp server and uses it to generate the traceability ID hash value.

[Structure of the Database DB]

Next, the structure of the database DB will be explained using FIG. 3. The database DB has a structure including a customer data table, a management item table, and a history table. The customer data table is one example of a user data table, and is a table having three items: the user ID hash value, the management item table, and the history table which are described above. Therefore, the customer data table is a table in which the user ID hash value, the management item table, and the history table are associated with each other.

The customer data table was created in advance before the registration data is registered in the history table. In the customer data table, data input into the items of "management item table" and "history table" is a character string each specifying the management item table and the history table, such as a name of the management item table and a name of the history table. In this description, the string means an unhashed string.

The management item table is a table that defines a processing step for the registration data acquired from the history table. Therefore, the management item table has, as one item, an item of "column name" that specifies the name of registration data registered in the history table.

The management item table shown in FIG. 3 includes two items, "display name" and "display flag" in addition to the column name. The item "display name" represents what the registration data means. In the example of FIG. 3, the display names are product name and company name. The item "display flag" is a flag indicating whether to display the registration data. All data entered in the management item table are character strings. The management item table may also be created in advance before registration data is registered in the history table. Of course, after registering the registration data in the history table, the management item table may be updated by changing the display flag, for example.

The history table is an example of the registration data table and is a table including the process data hash value and the registration data. The structure of the history table was created in advance before registration data is registered in the history table. In the history table shown in FIG. 3, registration data 01 and registration data 02 are created as items of the registration data. The data entered in the registration data item is a character string.

[Process for Registering the Registration Data]

Figure 4:
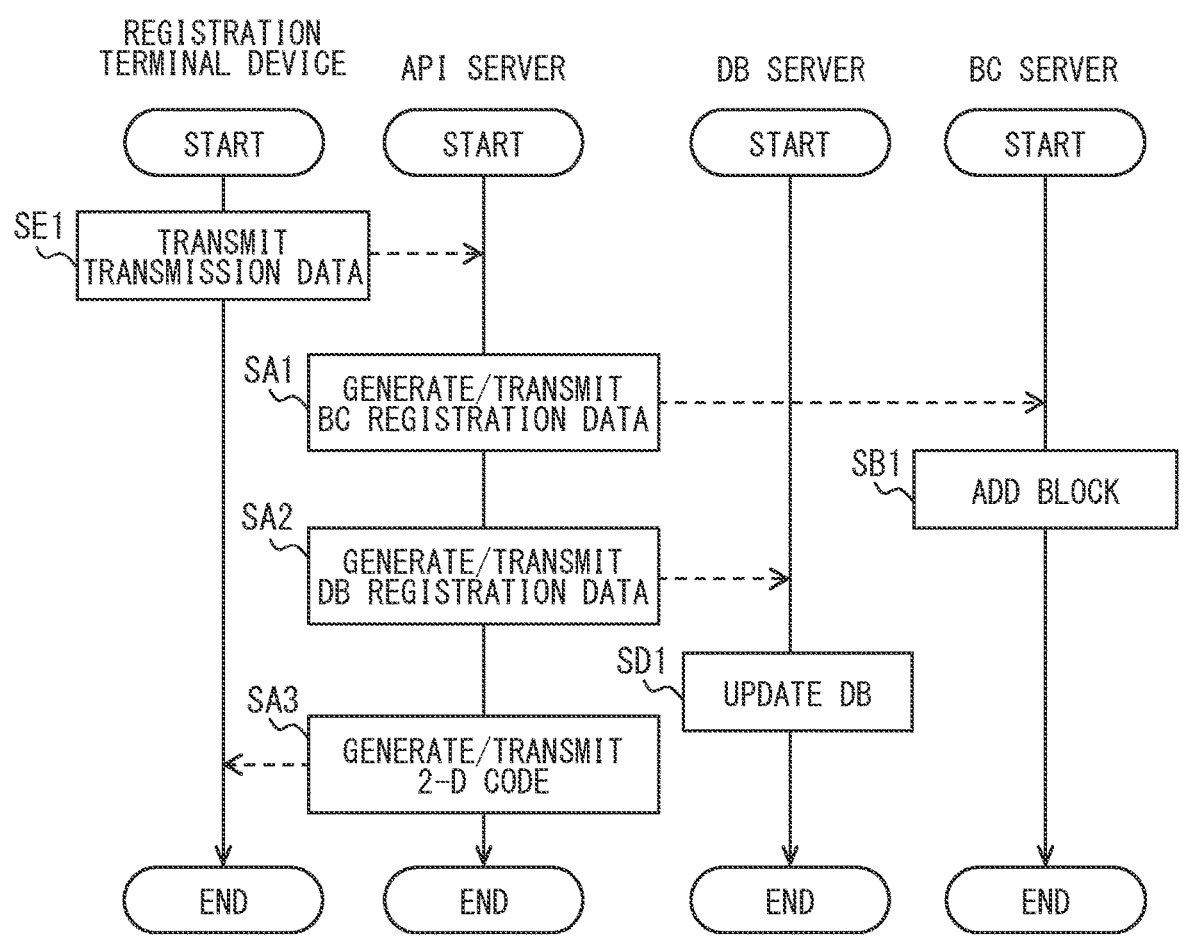
FIG. 4 is a diagram showing a process when registration data is registered in the database.

Next, a process for registering the registration data in the database DB will be described with reference to FIG. 4. First, when the registration data to be registered in the database DB is generated, a person operates the registration terminal device 10 to transmit the transmission data to the API server 20, as indicated by SE1. This transmission data is data containing the registration data and TokenID. TokenID is an example of a registrant ID that identifies a registrant who registers the registration data. TokenID was set in advance before transmitting the transmission data.

Also, when adding the registration data to the same blockchain BC, the transmission data also includes the traceability ID hash value stored in the 2-D code 80 transmitted from the API server 20 at SA3, as will be described later.

When the API server 20 acquires this transmission data, the registration data unit 21 executes the step of SA1. At SA1, BC registration data is generated and transmitted to the BC server 30. The BC registration data is data containing the user ID hash value, the process data hash value, the registration date/time, and the traceability ID hash value.

The API server 20 stores information indicative of a correspondence relationship such as a table for generating the user ID from TokenID. The registration data unit 21 generates the user ID from the correspondence relationship and the TokenID included in the transmission data acquired from the registration terminal device 10. TokenID is preferably a character string different from the user ID. The registration data unit 21 acquires the user ID hash value by hashing the generated user ID.

The process data hash value is the Merkle root of the registration data included in the transmission data. The registration date/time is any date and time during the period in which the process of SA1 is being executed. As described above, the traceability ID hash value is the Merkle root of the user ID hash value, the process data hash value, the date/time information, and the timestamp hash value.

When the BC server 30 acquires the BC registration data, the BC management unit 32 executes the step of SB1. At SB1, a block is added to the blockchain BC based on the BC registration data. A block to which the next block is added is specified by the traceability ID hash value included in the BC registration data. The transaction data among data stored in the block to be added was sent from the API server 20. Therefore, the BC management unit 32 generates a timestamp, a previous block hash value, and a nonce value. Thereafter, a new block is added to the blockchain BC after confirming that the consistency of the blockchain BC is maintained between the plurality of BC servers 30. This confirmation process is also called a consensus algorithm.

After executing the step of SA1, the registration data generation unit 21 of the API server 20 also executes the step of SA2. At SA2, the registration data generation unit 21 generates DB registration data and transmits the DB registration data to the DB server 40. The DB registration data is data containing the user ID hash value, the process data hash value, and the registration data. The user ID hash value and the process data hash value have already been created at SA1. The registration data is included in the transmission data.

When the DB server 40 acquires the DB registration data, the DB management unit 42 executes the step of SD1. At SD1, the database DB is updated based on the DB registration data. Specifically, the history table is specified by comparing the user ID hash value included in the DB registration data with the customer data table of the database DB. Next, the process data hash value and the registration data included in the DB registration data are added to the identified history table.

The registration data unit 21 of the API server 20 also executes the step of SA3. At SA3, the registration data unit 21 generates a 2-D code 80 storing the traceability ID hash value, and transmits the 2-D code 80 to the registration terminal device 10 that has transmitted the transmission data.

A person who operates the registration terminal device 10 that receives the 2-D code 80 or a processing device connected to the registration terminal device 10 makes the 2-D code 80 readable by the user terminal device 50. For example, the 2-D code 80 is printed out and pasted (attached) on a product or its packaging.

Note that if the transmission data transmitted from the registration terminal device 10 contains a traceability ID hash value, the step of SA3 may be omitted. This is because when the registration terminal device 10 transmits transmission data next time, the blockchain BC to which the transaction data is to be added can be identified using the traceability ID hash value that was already acquired by the registration terminal device 10.

[Process for Acquiring the Registration Data]

Figure 5:
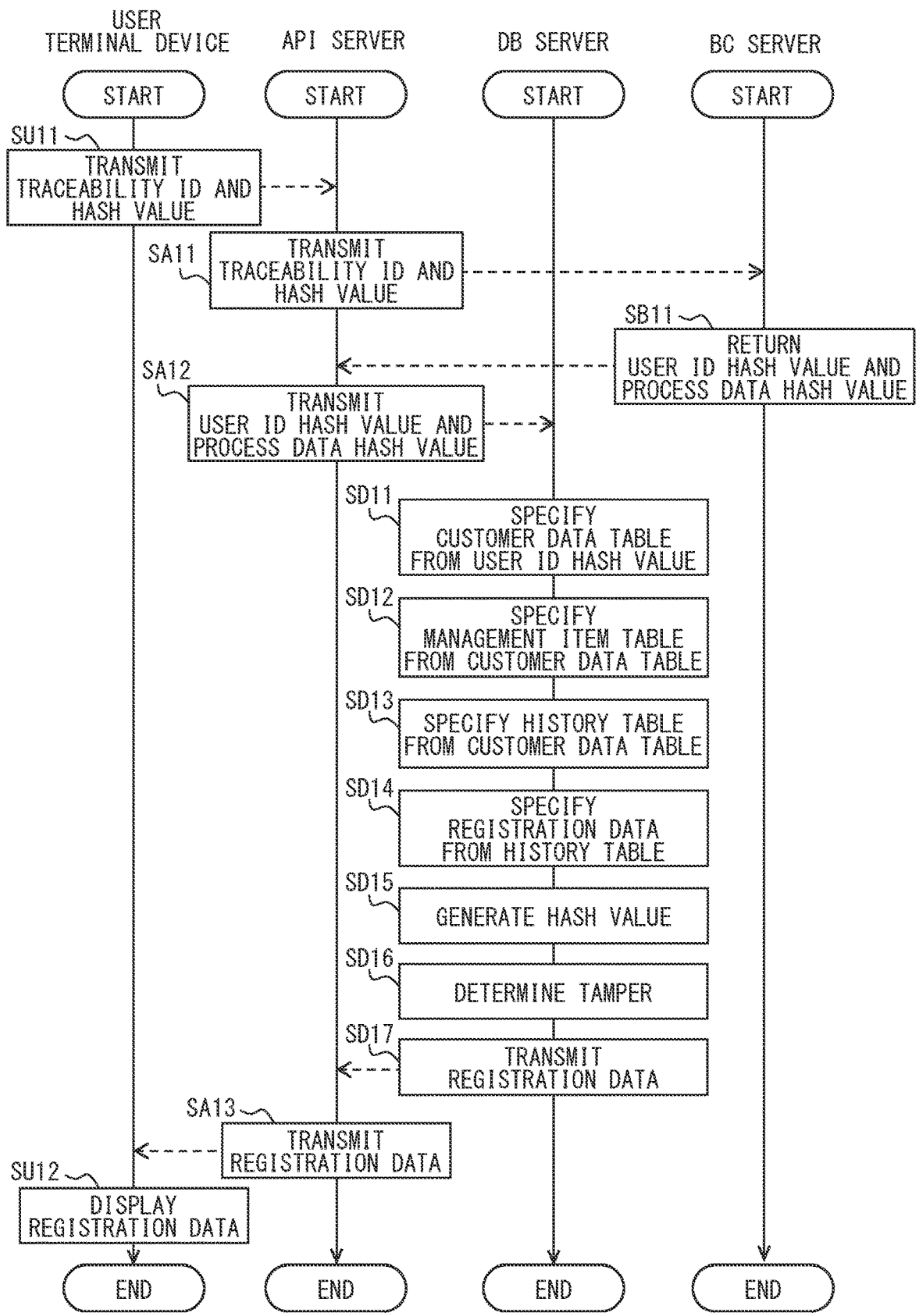
FIG. 5 is a diagram showing a process of acquiring the registration data from the database.

Next, a process of acquiring the registration data from the database DB via the user terminal device 50 will be described with reference to FIG. 5. In the process shown in FIG. 5, a data search method for searching registration data from the database DB is executed.

First, at SU11, the user terminal device 50 reads the 2-D code 80 attached to the product or its packaging, and acquires the traceability ID hash value stored in the 2-D code 80. Then, the traceability ID hash value is transmitted to the API server 20.

When the API server 20 acquires the traceability ID hash value, the search control unit 22 executes the step of SA11. At SA11, the search control unit 22 transmits the traceability ID hash value received from the user terminal device 50 to the BC server 30.

When the BC server 30 receives the traceability ID hash value, the BC management unit 32 executes the step of SB11. At SB11, the BC management unit 32 searches in the block chain BC for a block containing the received traceability ID hash value included in the transaction data. Then, the user ID hash value and the process data hash value included in the transaction data in the searched block are transmitted to the API server 20.

When the API server 20 receives the user ID hash value and the process data hash value from the BC server 30, the search control unit 22 executes the step of SA12. At SA12, the search control unit 22 transmits the user ID hash value and the process data hash value to the DB server 40.

When the DB server 40 receives the user ID hash value and the process data hash value, the DB search unit 43 executes the steps of SD11 to SD14. From SD11 to SD14, the registration data is retrieved from the database DB using the user ID hash value and the process data hash value. The user ID hash value and the process data hash value stored in the blockchain BC serve as search data for searching in the database DB.

At SD11, the received user ID hash value is used to identify the customer data table from the database DB. At SD12, the management item table is specified based on the management item table indicated in the customer data table specified at SD11.

At SD13, based on the history table shown in the customer data table specified at SD11, the history table from which the registration data is searched is specified. At SD14, the registration data corresponding to the process data hash value received from the API server 20 is specified from the history table specified at SD13.

The following steps of SD15 and SD16 are executed by the tamper determination unit 44. At SD15, a hash value is generated from the registration data specified at SD14 by the same method as the method by which the API server 20 generated the process data hash value.

At SD16, it is determined whether the registration data identified at SD14 has been tampered. The hash value generated at SD15 is compared with the process data hash value obtained from the API server 20, and if the two hash values match each other, the registration data specified at SD14 is determined not to be tampered. On the other hand, if the compared two hash values do not match each other, the registration data specified at SD14 is determined to be tampered.

The step of SD17 is executed by the DB search unit 43. At SD17, the registration data specified at SD14 is transmitted to the API server 20 together with the result of the tamper determination made at SD16.

When the API server 20 receives the registration data and the tamper determination result from the DB server 40, the search control unit 22 executes the step of SA13. The search control unit 22 transmits the registration data and the determination result to the user terminal device 50 at SA13.

The user terminal device 50 displays the registration data transmitted from the API server 20 and the tamper determination result on a display unit of the user terminal device 50 at SU12. It should be noted that when a determination result indicating that the registration data has been tampered is transmitted from the API server 20, only the result of the tamper determination may be displayed without displaying the registration data itself.

SUMMARY OF THE EMBODIMENT

As can be seen from the structure of the database DB shown in FIG. 3, the data search system 1 according to the present embodiment described above requires, as the search data, the user ID hash value and the process data hash value to search the registration data from the database DB. These user ID hash value and process data hash value are stored in the blockchain BC. Therefore, it is difficult to tamper the user ID hash value and the process data hash value.

On the other hand, the registration data registered in database DB is more likely to be tapered than data stored on the blockchain BC. However, if the registration data registered in the database DB is tampered, the hash value generated from the registration data at SD15 does not match the process data hash value obtained from the blockchain BC. Therefore, tampering can be easily detected by comparing the hash value generated at SD15 and the process data hash value obtained from the block chain BC.

Further, after obtaining the user ID hash value and the process data hash value, which are search data, from the blockchain BC, the data search system 1 of the present embodiment searches for the registration data in the database DB. In this way, by storing the search data on the blockchain BC and adopting a data structure for in which the registration data is registered in association with the search data in the database DB, it is possible to quickly search for the registration data.

Further, in this embodiment, along with the user ID hash value and the process data hash value, the traceability ID hash value is stored in the transaction data in the blockchain BC. Therefore, when the traceability ID hash value is specified, the user ID hash value and the process data hash value can be also specified. Also, along with this structure of the blockchain BC, the traceability ID hash value is also stored in the 2-D code 80.

The data length of the traceability ID hash value is shorter than the combined data length of the user ID hash value and the process data hash value. Therefore, compared to the situation where the user terminal device 50 provides the user ID hash value and the process data hash value to the API server 20, the amount of data transmitted from the user terminal device 50 to the DB server 40 via the API server 20 can be reduced.

Since the amount of data is small, the traceability ID hash value can be easily stored in the 2-D code 80. As a result, it is easier for the user terminal device 50 to read the 2-D code 80 and acquire the traceability ID hash value from the 2-D code. In other words, it is easy for the user terminal device 50 to provide data for specifying the registration data to the DB server 40 via the API server 20.

Further, the traceability ID hash value is generated with the input which includes the hash value generated by the timestamp server into an input in addition to the user ID hash value and the process data hash value which are the search data. Since the hash value generated by an external server, i.e., the timestamp server, is included in the input, it is possible to avoid a situation where all the data for generating the traceability ID hash value is known to a third party and, as a result, the traceability ID hash value is generated by the third party.

In addition, since the traceability ID hash value is generated by including the registration date/time into the input, even if the same registration data is registered in the database DB multiple times on the same day, it is possible to prevent the same traceability ID hash value from generating.

Also, the search data includes two types of data, i.e., a process data hash value and a user ID hash value. Then, the DB search unit 43 first identifies the history table using the user ID hash value, and then identifies the registration data using the process data hash value. In this way, by performing the process of searching for the registration data through the two steps, it is possible to quickly search for registration data.

Further, in this embodiment, the API server 20 includes the registration data unit 21. The registration data unit 21 acquires TokenID from the registration terminal device 10 and generates the user ID from the TokenID. Since the TokenID is converted into the user ID, even if the TokenID is known to a third party, the third party cannot generate the user ID hash value stored in the database DB. In the database DB, registration data is registered in association with the user ID hash value. Therefore, it is possible to prevent a third party from knowing the registration data registered in the database DB in association with a registrant.

Although the embodiment has been described above, the disclosed technology is not limited to the above-described embodiment, and the following modifications are included in the disclosed range, and various modifications can be made without departing from the gist except as described below. In the following description, elements having the same reference numerals as those used so far are the same as elements having the same reference numerals in the previous embodiments, except when specifically mentioned. When only a part of the configuration is described, the embodiment described above can be applied to other parts of the configuration.

First Modification

The data search system 1 according to the present embodiment has three types of servers: the API server 20, the BC server 30, and the DB server 40. However, only a single server having the function of the API server 20 and the function of the DB server 40 may be provided. Also, the server may have the function of the BC server 30.

Further, in a configuration in which the API server 20 and the DB server 40 are separately proved, the API server 20 may include the tamper determination unit 44.

Second Modification

In the above-described embodiment, the traceability ID hash value is generated using the user ID hash value, process data hash value, date/time information, and time stamp server hash value as inputs. However, one or both of the date/time information and the time stamp server hash value may be omitted from the above four types of the inputs. Furthermore, regardless of whether one or both of the date/time information and the timestamp server hash value are omitted, the traceability ID hash value may be generated without using the user ID hash value as an input. Especially when there are few users, the user ID hash value may be omitted.

If the user ID hash value is omitted, no user data table is provided in the database DB. If the user data table is not provided, the management item table and history table should be directly associated with each other. Also, if the user ID hash value is omitted, only the process data hash value serves as the search data.

Third Modification

In the above-described embodiment, TokenID is converted to the user ID. However, the TokenID may be used as it is as a user ID.

Fourth Modification

The API server 20, BC server 30, and DB server 40 are hereinafter referred to as control units. The control units and the method thereof according to the present disclosure may be implemented by one or more special-purposed computers. Such a special-purposed computer may be provided by a processor and a memory programmed to execute one or more functions embodied by a computer program, or by a processor including one or more dedicated hardware logic circuits. Alternatively, the control units and the method thereof according to the present disclosure may be implemented by a dedicated hardware logic circuit. Alternatively, the control units and the method described in the present disclosure may be implemented by one or more dedicated computers configured by a combination of a processor executing a computer program and one or more hardware logic circuits. The hardware logic circuits may be, for example, ASIC or FPGA.

The storage medium for storing the computer program is not limited to ROM. Alternatively, the computer program may be stored in a computer-readable, non-transitory tangible storage medium as instructions to be executed by a computer. For example, the program may be stored in a flash memory.

The invention claimed is:

1. A data search system that provides a user terminal device with registration data searched from a database in which a plurality of pieces of the registration data are registered, the system comprising:
    a blockchain server comprising a blockchain storage medium that is configured to store a blockchain on which search data for searching the registration data from the database is stored, the search data being hashed data that is generated based on the registration data registered in the database;
    a database (DB) server comprising a DB storage medium that is configured to store the database, the DB server configured to:
        acquire the registration data from the database and provide the user terminal device with the acquired registration data, wherein the plurality of pieces of the registration data is registered in the database in association with a plurality of pieces of the search data;
        search, based on the search data, the registration data registered in the database;
        determine whether the registration data is tampered with by:
            generating a hash value based on the registration data that is acquired; and
            comparing the generated hash value with the search data stored on the blockchain,
    wherein
    the block chain stores, along with the search data, identifying data in a block,
    the identifying data is a hash value generated based on the search data to identify the search data and has a data length shorter than that of the search data, and
    wherein
    searching the registration data comprises:
        acquiring the identifying data from the user terminal device;
        acquiring the search data from the blockchain using the acquired identifying data; and
        searching the registration data in the database using the acquired search data, and
    wherein
    the search data includes a registration data hash value acquired by hashing the registration data and a user ID hash value acquired by hashing a user ID.

2. The data search system according to claim 1, wherein the identifying data is generated using an input including the search data and a timestamp server hash value generated based on a date on which the search data was generated.

3. The data search system according to claim 1, wherein the identifying data is generated using an input including the search data and date/time data.

4. The data search system according to claim 1, wherein the database includes a registration data table in which the registration data hash value and the registration data are associated with each other and a user data table in which the registration data table and the user ID are associated with each other.

5. A data search method for providing a user terminal device with registration data that is searched from a database in which a plurality of pieces of the registration data are registered in association with a plurality of pieces of search data, the method comprising:
    storing the plurality of pieces of the search data on a blockchain, the search data being hashed data generated based on the registration data registered in the database and being used for searching the registration data;
    searching the registration data from the database based on the search data;
    providing the acquired registration data with the user terminal device;
    generating a hash value based on the registration data acquired from the database; and
    determining whether the registration data is tampered with by comparing the generated hash value with the search data stored on the blockchain,
wherein
    the block chain stores, along with the search data, identifying data in a block,
    the identifying data is a hash value generated based on the search data to identify the search data and has a data length shorter than that of the search data, and
wherein
    searching the registration data comprises:
        acquiring the identifying data from the user terminal device;
        acquiring the search data from the blockchain using the acquired identifying data; and
        searching the registration data in the database using the acquired search data, and
wherein
    the search data includes a registration data hash value acquired by hashing the registration data and a user ID hash value acquired by hashing a user ID.

* * * * *